United States Patent
Dixon

(10) Patent No.: US 9,444,544 B1
(45) Date of Patent: Sep. 13, 2016

(54) UNMANNED VEHICLE COMMUNICATION THROUGH SHORT MESSAGE SERVICE

(71) Applicant: APOLLO ROBOTIC SYSTEMS INCORPORATED, Tucson, AZ (US)

(72) Inventor: Taylor D. Dixon, Tucson, AZ (US)

(73) Assignee: APOLLO ROBOTIC SYSTEMS INCORPORATED, Pasadena, CA (US)

( * ) Notice: Subject to any disclaimer, the term of this patent is extended or adjusted under 35 U.S.C. 154(b) by 0 days.

(21) Appl. No.: 14/924,475

(22) Filed: Oct. 27, 2015

Related U.S. Application Data

(60) Provisional application No. 62/191,670, filed on Jul. 13, 2015.

(51) Int. Cl.
  *H04B 7/185*  (2006.01)
  *H04W 4/14*  (2009.01)
  *H04W 4/02*  (2009.01)

(52) U.S. Cl.
  CPC ......... *H04B 7/18506* (2013.01); *H04W 4/027* (2013.01); *H04W 4/14* (2013.01)

(58) Field of Classification Search
  CPC ...... H04W 4/14; H04W 4/12; B64C 39/024; B64C 2201/128; B64C 2201/146; B64C 2201/141; G05D 1/0088; G05D 1/0011
  See application file for complete search history.

(56) References Cited

U.S. PATENT DOCUMENTS

| | | | |
|---|---|---|---|
| 2010/0099442 A1* | 4/2010 | Chin | H04W 4/14 455/466 |
| 2010/0202327 A1* | 8/2010 | Mushkin | H04B 1/713 370/280 |
| 2011/0315817 A1* | 12/2011 | Miralles | B64C 39/024 244/63 |
| 2012/0185187 A1* | 7/2012 | Parakulam | H04Q 9/00 702/63 |
| 2015/0149531 A1* | 5/2015 | Wohlert | H04L 65/1006 709/203 |
| 2015/0172882 A1* | 6/2015 | Hua | H04W 4/14 455/466 |
| 2015/0248640 A1* | 9/2015 | Srinivasan | G06Q 10/08355 705/338 |

OTHER PUBLICATIONS

3GPP TS 23.040 V10.0.0 (Mar. 2011) Technical realization of the Short Message Service (SMS) (Release 10).*

* cited by examiner

*Primary Examiner* — Nathan Mitchell
*Assistant Examiner* — Ernest Tacsik
(74) *Attorney, Agent, or Firm* — Hayes Soloway P.C.

(57) ABSTRACT

A method is disclosed for an unmanned vehicle using a Short Message Service (SMS) to relay information to and from a separate management system is disclosed. All or portions of the payload/data to be transmitted to and from the unmanned vehicle and management system uses this SMS, specifically payload/data that aids in the operation and location determination (such as GPS data) of the unmanned vehicle.

4 Claims, 4 Drawing Sheets

UNMANNED VEHICLE COMMUNICATION THROUGH SHORT MESSAGE SERVICE

CROSS REFERENCE TO RELATED APPLICATIONS

This application claims priority to U.S. provisional patent application No. 62/191,670, filed Jul. 13, 2015, which is hereby incorporated by reference in its entirety.

FIELD OF THE INVENTION

The present disclosure is generally related to unmanned vehicle communication system and methods for unmanned vehicle communication through short message service (SMS).

BACKGROUND OF THE INVENTION

Communications between unmanned vehicles and their controllers exist in a variety of forms; currently, the unmanned vehicles market is saturated with communication methods that fail to recognize the power usage of said communication as an important factor with respect to the overall power usage of the unmanned vehicle. Current examples of communication methods being used are socket supported data connections and ISM radio band communication (more commonly 2.4 GHz, 915 MHz, RF spectrum). These methods of communication vary in power consumption, but undoubtedly require a higher level of power consumption to operate normally relative to a majority of the various power requirements for Short Message Services (SMS).

Reducing the power requirement for an unmanned vehicle inherently allows it to operate for longer periods of time or dedicate more power to one of its functions. Any such power improvement is essential in engineering more efficient unmanned vehicles and is applicable to all of its possible functions and assigned tasks. Overall, the use of a SMS communication system simplifies the entire communication process and inherently reduces the risk of error being introduced to the system. The use of a SMS has unique capabilities that other communication methods do not offer. Specifically the use of a SMS is supported by the current inherent positive characteristics of a SMS. These characteristics include but are not limited to a wider area of coverage, strong existing infrastructure, and with an increasing transition to data supported messaging services by the general population, the Usage of a SMS is less intensive on networks. Whereas other communication networks such as 4G LTE datalinks are not covered in certain areas of the United States, SMSs are readily available in a majority of inhabited areas.

SUMMARY OF THE INVENTION

Embodiments of the invention relate to unmanned vehicle communication system and methods for unmanned vehicle communication through SMS.

In accordance with one embodiment of the present invention, a method for an unmanned vehicle using a Short Message Service (SMS) to relay information to and from a separate management system is disclosed. All or portions of the payload/data to be transmitted to and from the unmanned vehicle and management system uses this SMS, specifically payload/data that aids in the operation and location determination (such as GPS data) of the unmanned vehicle. This method of communication offers a new, low power solution for unmanned vehicle communication by utilizing existing cellular technology. The unmanned vehicle and management system are defined as having at least one computer unit/device, with the management system also requiring a user interface and subsequent additional computers and/or systems to accomplish its management tasks.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims

BRIEF DESCRIPTION OF THE DRAWINGS

Reference will be made to exemplary embodiments of the present invention that are illustrated in the accompanying figures. Those figures are intended to be illustrative, rather than limiting. Although the present invention is generally described in the context of those embodiments, it is not intended by so doing to limit the scope of the present invention to the particular features of the embodiments depicted and described.

Various implementations and embodiments may be practiced in line with the specification. All of these implementations and embodiments are intended to be included within the scope of the invention.

DETAILED DESCRIPTION OF THE PREFERRED EMBODIMENTS

In the following description, for the purpose of explanation, specific details are set forth in order to provide an understanding of the present invention. The present invention may, however, be practiced without some or all of these details. The embodiments of the present invention described below may be incorporated into a number of different means, components, circuits, devices, and systems. Structures and devices shown in block diagram are illustrative of exemplary embodiments of the present invention. Connections between components within the figures are not intended to be limited to direct connections. Instead, connections between components may be modified, re-formatted via intermediary components. When the specification makes reference to "one embodiment" or to "an embodiment", it is intended to mean that a particular feature, structure, characteristic, or function described in connection with the embodiment being discussed is included in at least one contemplated embodiment of the present invention. Thus, the appearance of the phrase, "in one embodiment," in different places in the specification does not constitute a plurality of references to a single embodiment of the present invention.

Many embodiments of the disclosure may take the form of computer-executable instructions, including algorithms executed by a programmable computer. However, the disclosure can be practiced with other computer system configurations as well. Certain aspects of the disclosure can be embodied in a special-purpose computer or data processor that is specifically programmed, configured or constructed to perform one or more of the computer-executable algorithms described below.

Figure 1:
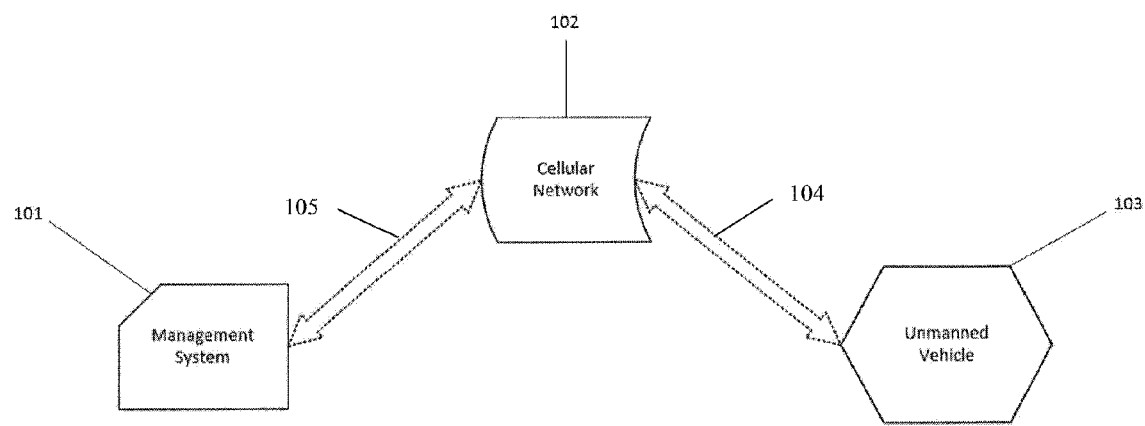
FIG. 1 shows a process of communication between the external management system, the cellular network, and the unmanned vehicle in accordance with an embodiment of the present invention.

FIG. 1 illustrates a generic system diagram in which the management system 101, cellular network 102 and unmanned vehicle 103 exist within a communication environment in which embodiments of the present invention may be employed. As shown in FIG. 1, the management system 101 and unmanned vehicle 103 are in communication with each other via the cellular network 102 through a communication path 104 between the unmanned vehicle 103 and the cellular network 102 and a communication path 105 between the management system 101 and the cellular network 102. The communication paths 104 and 105 are bidirectional and comprise at least one channel and support SMS function to allow SMS communication. The communication paths 104 and 105 may or may be the same, or under the same communication protocol. In some cases, embodiments of the present invention may further include one or more network devices with which the management system 101 and unmanned vehicle 103 may communicate to provide, request and/or receive information.

The cellular network 102 may include a collection of various different nodes, devices or functions that may be in communication with each other via corresponding wired and/or wireless interfaces. As such, the cellular network 102 should be understood to be an example of a broad view of certain elements of the system and not an all-inclusive or detailed view of the cellular network 102. The unmanned vehicle 103 and management system 101 may also communicate via device to device (D2D) communication as part of the attempt to communicate via the cellular network 102, and each may include a telemetry unit for transmitting signals to and for receiving signals from a cellular base site which could be, for example, a base station that is a part of one or more cellular or mobile networks or an access point that may be coupled to a data network, such as a local area network (LAN), a metropolitan area network (MAN), and/or a wide area network (WAN), such as the Internet. In some embodiments, the cellular network may utilize one or more mobile access mechanisms such as wideband code division multiple access (W-CDMA), CDMA2000, global system for mobile communications (GSM), general packet radio service (GPRS), long term evolution (LTE), LTE Advanced and/or other similar mechanisms.

Figure 2:
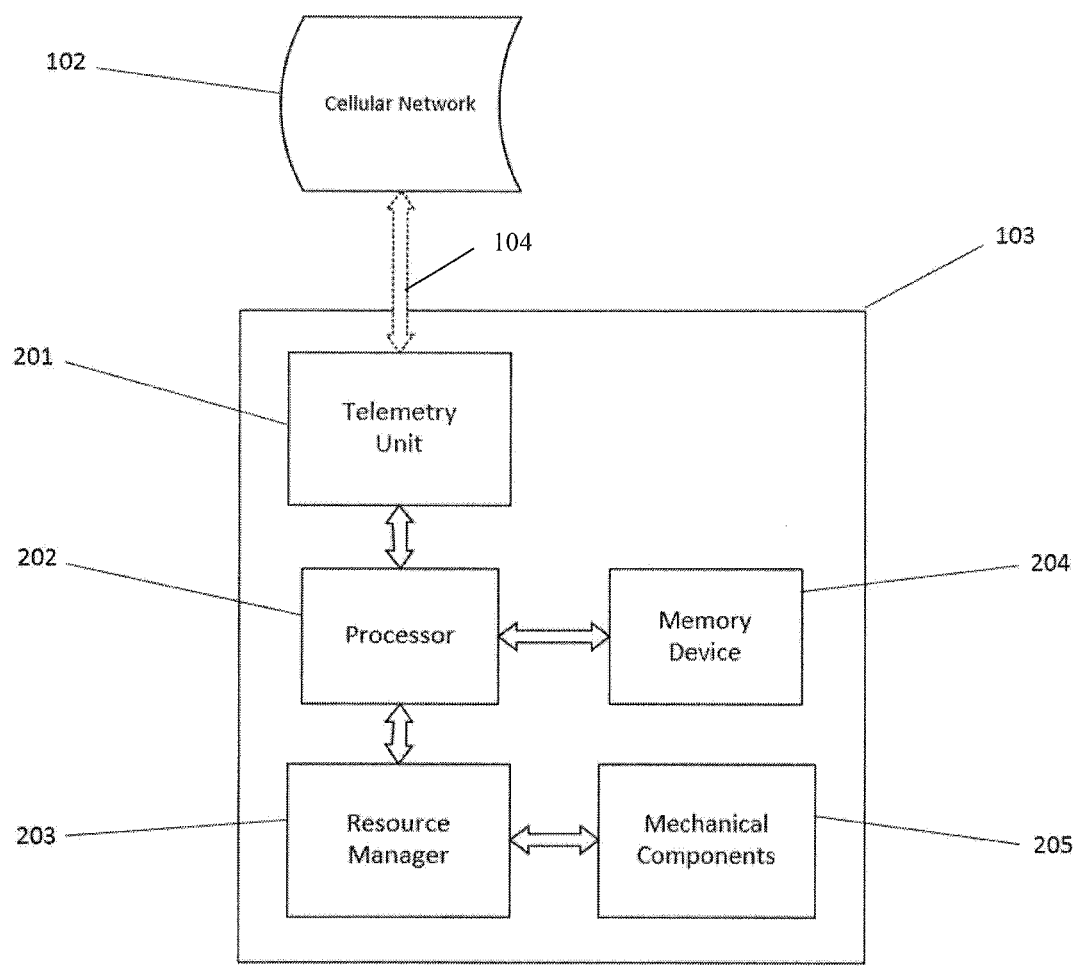
FIG. 2 shows a minimum composition of the device that is present in the unmanned vehicle, and may be present in the external management system in accordance with an embodiment of the present invention.

Referring to FIG. 2, the unmanned vehicle 103 may include a telemetry unit 201, a processor 202, a resource manager 203, a memory device 204, and mechanical components 205. The memory device 204 may include, for example; one or more volatile and/or non-volatile memories. In other words, for example, the memory device 204 may be an electronic storage device (e.g., a computer readable storage medium) comprising gates configured to store data (e.g., bits) that may be retrievable by a machine (e.g., a computing device). The memory device 204 may be configured to store information, data, applications, instructions or the like for enabling the apparatus to carry out various functions in accordance with example embodiments of the present invention. For example, the memory device 204 could be configured to buffer input data for processing by the processor 202. Additionally or alternatively, the memory device 204 could be configured to store instructions for execution by the processor 202.

The processor 202 may be embodied in a number of different ways. For example, the processor 202 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 202 may be configured to execute instructions stored in the memory device 204 or otherwise accessible to the processor 202. Alternatively or additionally, the processor 202 may be configured to execute hard coded functionality. As such, whether configured by hardware or software methods, or by a combination thereof, the processor 202 may represent an entity (e.g., physically embodied in circuitry) capable of performing operations according to embodiments of the present invention while configured accordingly. Thus, for example, when the processor 202 is embodied as an ASIC, FPGA or the like, the processor 202 may be specifically configured hardware for conducting the operations described herein. Alternatively, as another example, when the processor 202 is embodied as an executor of software instructions, the instructions may specifically configure the processor 202 to perform the algorithms and/or operations necessary for the unmanned vehicle 103 to operate successfully. However, in some cases, the processor 202 may be a processor of a specific device (e.g., an eNB, AP or other network device) adapted for employing embodiments of the present invention, and may entail further configuration of the processor 202. The processor 202 may include, among other things, a clock, an arithmetic logic unit (ALU) and logic gates configured to support operation of the processor 202.

Meanwhile, the telemetry unit 201 may be any means such as a device or circuitry embodied in either hardware, software, or a combination of hardware and software that is configured to receive and/or transmit data from/to a cellular network 102 and/or any other device or module in communication with the apparatus. In this regard, the telemetry unit 201 may include, for example, an antenna (or multiple antennas) and supporting hardware and/or software for enabling communications with a wireless communication network. In some environments, the telemetry unit 201 may alternatively or also support wired communication. As such, for example, the telemetry unit 201 may include a communication modem and/or other hardware/software for supporting communication via cable, digital subscriber line (DSL), universal serial bus (USB) or other mechanisms.

In some embodiments, the telemetry unit 201 may support SMS communication through the communication path 104 to the cellular network 102 via at least one communication protocol, such as GSM, CDMS, TDMA, LTE, etc. The telemetry unit 201 receives information from the cellular network through the communication path 104. The information may be sent using SMS or other communication formats. During the operation of the unmanned vehicle 103, the telemetry unit 201 may be configured to send short messages to the cellular network actively or upon request from the management system 101. The short messages may be refreshed and sent on a repetitive schedule. The message may be compiled from information selected from current location, speed, altitude, destination, power reserve information of the unmanned vehicle 103. Alternatively, the message may be designated or compiled according to a specific request from the management system. In some embodiments, the repetitive interval may be a predetermined parameter stored within the memory device 204. In some embodiments, the repetitive interval may be dynamically determined based on at least one parameter selected from current location, speed, altitude, destination, power reserve information of the unmanned vehicle 103. For example, when the power reserve of the unmanned vehicle 103 is below a reserve threshold, the telemetry unit 201 may reduce the repetitive interval to send short message more frequently. In some embodiments, the repetitive interval may be determined by a request from the management system 101.

In some embodiments, the telemetry unit 201 may support SMS communication through the communication path 104 via multiple communication protocols. For example, the telemetry unit 201 may send a short message using a first communication protocol. If no reply or conformation received within a time threshold, the telemetry unit 201 then sends the short message via a second communication protocol different from the communication protocol. If still no reply or conformation received within the time threshold, the telemetry unit 201 may switch back to the first communication protocol to resend short message. The time threshold may be a predetermined parameter stored within the memory device 204. In some embodiments, the time threshold is configured to be smaller than the repetitive interval such that the same short message may be resent before the short message to be sent is refreshed.

In some embodiments, when the power reserve of the unmanned vehicle 103 is below the reserve threshold, the telemetry unit 201 is configured to send short message via both the communication protocols and/or reduce the repetitive interval to send short message more frequently. In some embodiments, when the processor 202 detects any mechanical breakdown, the telemetry unit 201 is configured to send short message via both the communication protocols and also reduce the repetitive interval to send short message more frequently.

In an example embodiment, the processor 202 may be embodied as, include or otherwise control a resource manager 203. The resource manager 203 may be any means such as a device or circuitry operating in accordance with software or otherwise embodied in hardware or a combination of hardware and software (e.g., processor 202 operating under software control, the processor 202 embodied as an ASIC or FPGA specifically configured to perform the operations described herein, or a combination thereof) thereby configuring the device or circuitry to perform the corresponding functions of the resource manager 203 as described herein. Thus, in implementations in which software is employed, a device or circuitry (e.g., the processor 202) executing the software forms the structure associated with such means.

In the example embodiment of the present invention, the resource manager 203 would be configured to control all mechanical components 205 of the unmanned vehicle 103. Upon receiving instructions from the processor 202, the resource manager 203 would interpret and translate the instructions to actions performed by the mechanical components 205. The mechanical components 205 of the unmanned vehicle 103 may include but are not limited to rotors, rudders, mechanical or robotics arms, retractable cables, gimbals, or other mechanical apparatus. In some cases, the processor 202 may be enabled to configure subframes of the cellular (or other communication interface) downlink signaling structure. Furthermore, the processor 202 may provide information to the unmanned vehicle 103 and the management system 101 (or other machines) via the telemetry unit 201 indicating the configuration to the signaling structure so that the unmanned vehicle 103 and the management system 101 may utilize the corresponding signaling structure accordingly.

Figure 3:
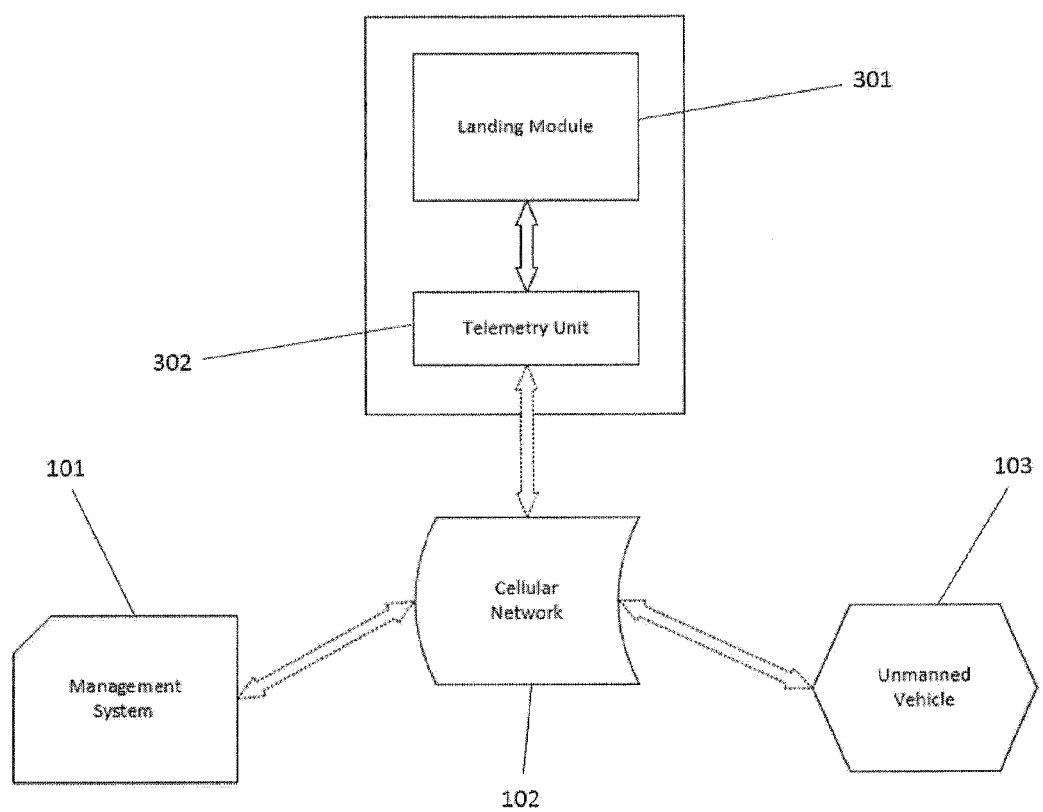
FIG. 3 shows an example communication path diagram between the unmanned vehicle, an external management system and a landing platform in accordance with an embodiment of the present invention.

FIG. 3 illustrates one system that may be implemented for SMS communication between a landing module's 301 telemetry unit 302, an unmanned vehicle 103 and management system 101 via a cellular network 102. Through this system the external management system 101 will relay SMS data to the telemetry unit 201 of the unmanned vehicle 103. The telemetry unit 201 will then transmit the data to the processor 202 which will then decide whether the data needs to be stored in the memory device 204 or sent to the telemetry unit via the cellular network 102. Specifically the telemetry unit 201 on the unmanned vehicle 103 may communicate with the telemetry unit 302 that is located on a landing module 301. Implementations that may arise as a result of this communication between the unmanned vehicle 103 and landing module 301 include but are not limited to informing the landing module 301 that the unmanned vehicle 103 is traveling or performing an approach towards the landing module 301.

Figure 4:
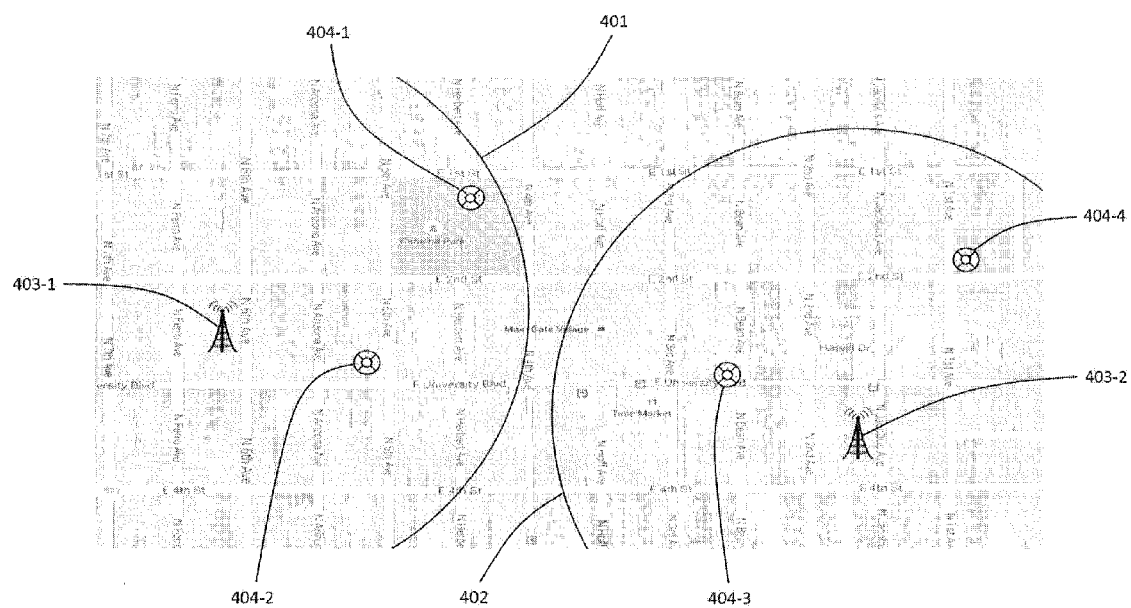
FIG. 4 shows one possible configuration of unmanned vehicle positions for a graphical user interface showing the position of unmanned vehicles, cellular towers, and how communication between them occurs in accordance with an embodiment of the present invention.

FIG. 4 is a graphical representation of how multiple unmanned vehicles 404 may communicate with a cellular network via SMS by communicating with the closest cellular towers 403. Each individual unmanned vehicle 404 should be understood to possess all the capabilities and components described of the unmanned vehicle 103 in prior figures. As shown in the present example of the present invention, each individual unmanned vehicle 404 will communicate with a cellular tower 403 according to which area of ideal connectivity it is located in, as defined by the connectivity boundaries 401. For example, as seen in the example configuration, unmanned vehicles 404-1 and 404-2 would communicate with the cellular tower 403-1, seeing as both lie within the connectivity boundary 401 corresponding to the cellular tower 403-1. Similarly, the unmanned vehicles 404-3 and 404-4 would communicate with the cellular tower 403-2, since both lie within the connectivity boundary 402 corresponding to the cellular tower 403-2. Each cellular tower 403 and corresponding connectivity boundary define a base station at the center of a geographic cell, of which all cellular networks are comprised. The unmanned vehicles 404 will then have the ability to efficiently communicate across this larger cellular network and with other systems or devices connected to the same network. Examples of said other systems and devices include but are not limited to landing modules, other unmanned vehicles 404, management systems, personal cellular communications devices, and relay stations.

While various embodiments have been described, those skilled in the art will recognize modifications or variations which might be made without departing from the present disclosure. The examples illustrate the various embodiments and are not intended to limit the present disclosure. For example, terminology such as "landing" and other unmanned aerial vehicle specific terminology may have been used to describe unmanned vehicles in general; specific unmanned vehicle terminology should be interpreted as being synonymous to the actions or descriptions of any other unmanned vehicle where appropriate. Therefore, the description and claims should be interpreted liberally with only such limitation as is necessary in view of the pertinent prior art.

The invention claimed is:

1. A method for short message service (SMS) between an unmanned vehicle and a cellular network, the method comprising:
   compiling a short message from information obtained from at least one of a current location, a speed, an altitude, a destination, and a power reserve of the unmanned vehicle; and
   sending the short message on a repetitive interval over a communication path between the unmanned vehicle and the cellular network, the communication path supporting at least one communication protocol;
   wherein the short messages are sent from the unmanned vehicle using a first communication protocol, if no reply or conformation received within a time threshold, the short messages are sent via a second communication protocol different from the communication protocol, if still no reply or conformation received within the time threshold, the short messages are sent via the first communication protocol again;
   wherein the time threshold is smaller than the repetitive interval;
   wherein the short messages are refreshed on the repetitive interval; and
   when the power reserve of the unmanned vehicle is below a reserve threshold, the short messages are sent via both the communication protocols and with a reduced repetitive interval.

2. The method of claim 1 wherein the repetitive interval is a predetermined parameter stored within the unmanned vehicle.

3. The method of claim 1 wherein the repetitive interval is determined by a request received at the unmanned vehicle.

4. The method of claim 1 wherein the repetitive interval is dynamically determined based on at least one parameter selected from the group consisting of the current location, the speed, the altitude, the destination, and the power reserve of the unmanned vehicle.

* * * * *